United States Patent [19]

Bariand et al.

[11] Patent Number: 6,094,032
[45] Date of Patent: Jul. 25, 2000

[54] METHOD OF CONTROLLING RAPID CHARGING OF AN INDUSTRIAL STORAGE CELL HAVING AN ALKALINE ELECTROLYTE

[75] Inventors: Marc Bariand; Thierry Berlureau; Jean-Louis Liska, all of Bordeaux, France

[73] Assignee: Alcatel, Paris, France

[21] Appl. No.: 09/373,238

[22] Filed: Aug. 12, 1999

[30] Foreign Application Priority Data

Aug. 13, 1998 [FR] France .................................. 98 09914

[51] Int. Cl.[7] .................................................. H01M 10/44
[52] U.S. Cl. ............................................. 320/125; 320/160
[58] Field of Search ..................... 320/125, 128, 320/150, 152, 153, 160, 162, FOR 119, FOR 121, FOR 134, FOR 138

[56] References Cited

U.S. PATENT DOCUMENTS 5,315,228  5/1994  Hess et al. .
5,659,239  8/1997  Sanchez et al. .
5,703,468  12/1997  Petrillo .

*Primary Examiner*—Edward H. Tso
*Attorney, Agent, or Firm*—Sughrue, Mion, Zinn, Macpeak & Seas, PLLC

[57] ABSTRACT

The present invention provides a method of controlling rapid charging of an alkaline-electrolyte industrial storage cell of the "maintenance-free" or "sealed" type, the cell possessing a nominal capacity Cn, a voltage U, and an internal temperature T, wherein charging is stopped at a percentage charge greater than 75% of Cn as follows:

a voltage threshold Us is fixed which corresponds to the desired final percentage charge for said cell;

the voltage U and the temperature T of said cell are measured;

a corrected voltage Uc is calculated using the following formula:

$$Uc = U - k(T - Tc)$$

where voltages are expressed in volts, Tc is an arbitrarily-selected reference temperature, and k is a constant coefficient expressed in volts per temperature unit; and Uc is compared with said voltage threshold Us, and charging is stopped when Uc is not less than Us.

6 Claims, 4 Drawing Sheets

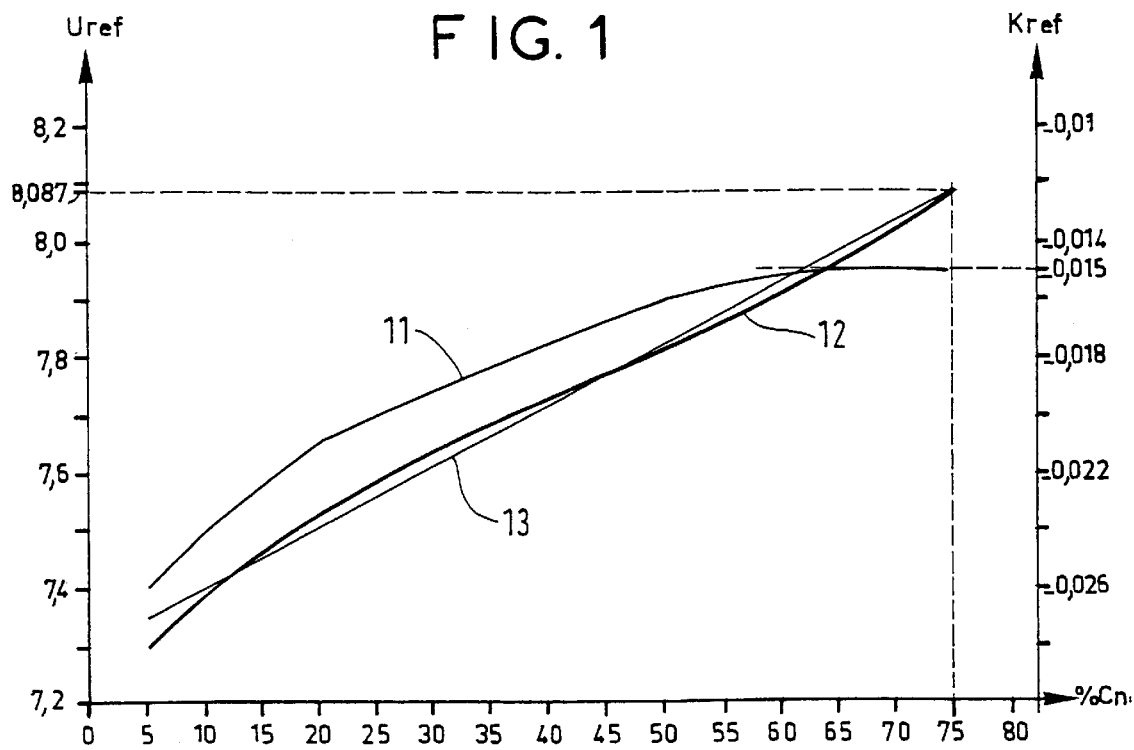
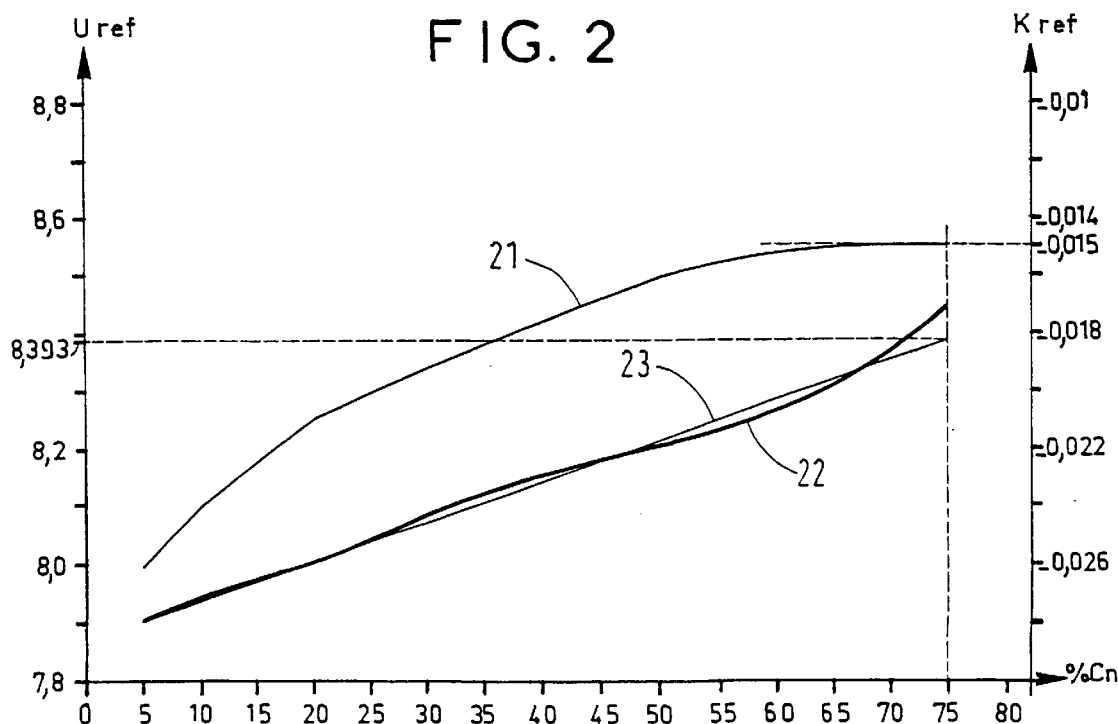

METHOD OF CONTROLLING RAPID CHARGING OF AN INDUSTRIAL STORAGE CELL HAVING AN ALKALINE ELECTROLYTE

The present invention relates to a method of control that can be used when rapidly charging an industrial storage cell having an alkaline electrolyte, in particular a cell of the "maintenance-free" type or of the "sealed" type, and more particularly a nickel metal hydride storage cell (Ni-MH).

BACKGROUND OF THE INVENTION

A storage cell is said to be "industrial" when it is of large capacity, i.e. greater than 10 Ah, and generally of capacity lying in the range 50 Ah to 200 Ah. Such cells generally have a container that is prismatic in shape, being made of a plastics material and containing electrodes that are plane. The parallelepiped shape of such cells and the nature of their cases do not enable them to withstand significant excess pressure, and the maximum internal pressure they can withstand is of the order of 1 bar to 2 bars.

Industrial storage cells of the type that is to said to be "maintenance-free" or of the type that is said to be "sealed" have the advantage of not requiring the aqueous electrolyte to be topped up at any time during use, unlike industrial storage cells of the "conventional open" type or of the "reduced-maintenance open" type. Batteries of such cells are used in particular for electric traction in vehicles. In this application, the required lifetime is about 1500 charge/discharge cycles over a period estimated at 10 years. Such a long lifetime cannot be achieved without enforcing strict limitations on overcharging. In addition, "fleet" type use of such vehicles means that it is necessary to be able to perform recharging in a short length of time, for example it should be possible to recharge 40% of nominal capacity in less than 15 minutes, while also guaranteeing that there will be no overcharging.

While an alkaline-electrolyte storage cell is being charged, the electrochemically active materials of its positive and negative electrodes are subjected respectively to oxidation and to reduction. These reactions take place without any gas being given off. Once the positive active material has been fully oxidized, the cell enters into overcharging. Abundant release of gaseous oxygen then appears on the positive electrode.

Under rapid charging conditions, the oxygen that is released has no time in which to be reduced (or recombined) at the negative electrode. This gives rise simultaneously to an increase in the temperature and in the internal pressure of the storage cell. "Maintenance-free" or "sealed" type industrial storage cells have a maximum operating pressure of about 2 bars. Any increase in internal pressure leads to a valve opening, and thus to a loss of electrolyte, thereby reducing the lifetime of the battery by drying out. In addition, significant heating occurs which is also prejudicial to the lifetime of the storage cell.

It is therefore necessary to have a method that makes it possible to recharge an alkaline-electrolyte industrial battery, in particular of the "maintenance-free" or "sealed" type, and to do so in a short period of time while nevertheless avoiding overcharging: charging must be stopped no later than the battery reaching a charge percentage of 100%. The method must also be applicable regardless of the initial state of charge of the battery and regardless of its temperature.

End-of-charge criteria have already been proposed such as monitoring the increase in temperature ($+\Delta\theta$) of a storage cell, the rate at which its temperature varies ($d\theta/dt$), or indeed the increase in temperature of the cell compared with expected heating conditions.

These criteria are suitable for so-called "portable" storage cells which are of small size and small capacity (up to 10 Ah). They have a container which is generally in the form of a metal cylinder. Portable storage cells have low thermal inertia: they heat up relatively little, but they are highly sensitive to variations in outside temperature. This can be taken into account by effecting a correction for ambient temperature. These criteria can also be used under slow charging conditions with industrial storage cells of small capacity, providing thermal inertia is minimized.

Such a correction has no effect on an industrial storage cell having capacity that is significantly greater than that of portable storage cells, in particular of capacity greater than 50 Ah. Industrial cells heat up significantly while the nature of the case (plastics material) is not suitable for easily dumping the heat generated during charging. The thermal inertia of such cells makes it impossible to stop charging on the basis of cell temperature.

In addition, criteria using temperature are difficult to apply to the Ni-MH couple because of its continuous increase in temperature throughout the duration of charging.

Furthermore, the voltage drop criterion ($-\Delta V$) commonly used for the Ni-Cd couple cannot be applied in the present case since that criterion corresponds to overcharging that has already begun. In addition, a criterion based on voltage is not very reliable because of the small voltage signal delivered by the Ni-MH couple at the end of charging (0 mV to $-5$ mV).

For a storage cell of high capacity, and in particular an Ni-MH cell, rapid rate charging governed by the above-mentioned previously-known criteria leads either to end of charging being detected prematurely, so that charging is insufficient, or else to end of charging not being detected, in which case the cell is destroyed.

OBJECTS AND SUMMARY OF THE INVENTION

The present invention provides a method of controlling rapid rate charging of an alkaline-electrolyte industrial storage cell of the "maintenance-free" or "sealed" type, and in particular a nickel and metal hydride cell, more particularly a cell or battery of cells having large capacity (not less than 50 Ah). The method of the invention guarantees that charging stops at the prescribed level of charge, lying in the range 60% to 100% of the nominal capacity Cn of the cell, regardless of its initial state of charge, and regardless of its temperature in the range $-30°$ C. to $+50°$ C.

The present invention provides a method of controlling rapid charging of an alkaline-electrolyte industrial storage cell of the "maintenance-free" or "sealed" type, the cell possessing a nominal capacity Cn, a voltage U, and an internal temperature T, wherein charging is stopped at a percentage charge greater than 75% of Cn as follows:

- a voltage threshold Us is fixed which corresponds to the desired final percentage charge for said cell;
- the voltage U and the temperature T of said cell are measured;
- a corrected voltage Uc is calculated using the following formula:

$$Uc = U - k(T - Tc)$$

where voltages are expressed in volts, Tc is an arbitrarily-selected reference temperature, and k is a constant coefficient expressed in volts per temperature unit; and Uc is compared with said voltage threshold Us, and charging is stopped when Uc is not less than Us.

The term "rapid" charging is used to mean charging performed at a rate of not less than 0.5 Ic, and preferably of the order of Ic to 2 Ic, where Ic is the current required to discharge the nominal capacity Cn of said cell in one hour.

The coefficient k is independent of the internal temperature of the storage cell and of external temperature over the range for which it is valid, i.e. for rates of charge greater than 55% of Cn. It is also independent of charging rate, and in particular charging rate in the range 0.75 Ic to 1.5 Ic. Its value is determined experimentally for each model of storage cell or battery of storage cells.

Said coefficient k is defined as follows:
the straight line U=f(T) is plotted for each percentage charge, from charging curves of said storage cell established at at least two different initial temperatures; and
the slope of said straight line is measured in the range of percentage charge greater than 55% of Cn, said slope being equal to k.

The slope kref varies with storage cell charging rate up to a value of not less than 55% of Cn, after which it remains constant.

The voltage threshold Us corresponding to the desired final charging rate is determined experimentally on the basis of the straight line showing variation of a reference voltage Uref as a function of charging rate as a % of Cn for said storage cell. This threshold Us is applicable only in the range of charging rates greater than 55% of Cn.

The voltage threshold Us is specific to the storage cell and depends on its state of aging. For a given final charging rate, it varies depending on the selected charging rate of 0.70 volts per Ic, giving, for example, an increase of 0.525 V of Us on going from a rate of 0.75 Ic to a rate of 1.5 Ic, while the reference temperature Tc remains unchanged.

Said voltage threshold Us is fixed as follows:
a reference voltage Uref is calculated from a charging curve of said storage cell, using the formula:

Uref=U−kref(T−Tc)

in which kref is a coefficient equal to the slope of the straight line U=f(T) which is variable for percentage charge less than or equal to 55% of Cn, and then constant for percentage charge greater than 55% of Cn;
the equation of the straight line for variation of Uref as a function of percentage charge is determined; and
said threshold Us is calculated from said equation for a desired final percentage charge greater than 55% of Cn.

Said voltage threshold Us depends on the charging rate of 0.70 V per current unit expressed in terms of Ic, where Ic is the current required for discharging the nominal capacity Cn of said storage cell in one hour.

The reference temperature Tc is a temperature that is selected arbitrarily and can have any value, including 0° C. The internal temperature T and the reference temperature Tc can be expressed in any conventional temperature units.

It will be understood that the corrected voltage Uc represents the voltage U which the storage cell U would have if its internal temperature T were equal to Tc.

In a variant of the invention, said reference temperature Tc is equal to 0° C., said reference voltage Uref is calculated by the formula:

Uref=U−(kref×T)

and said corrected voltage is calculated using the following formula:

Uc=U−kT

BRIEF DESCRIPTION OF THE DRAWINGS

The invention will be better understood and other advantages and features thereof will appear on reading the following description, given by way of non-limiting example and with reference to the accompanying drawings, in which:

FIG. 1 shows the variation in the corrected voltage Uref and the coefficient kref of a battery having a nominal capacity Cn=93 Ah during rapid charging for Tc=23° C.;

FIG. 2 is analogous to FIG. 1 for Tc=0° C.;

MORE DETAILED DESCRIPTION

Figure 3:
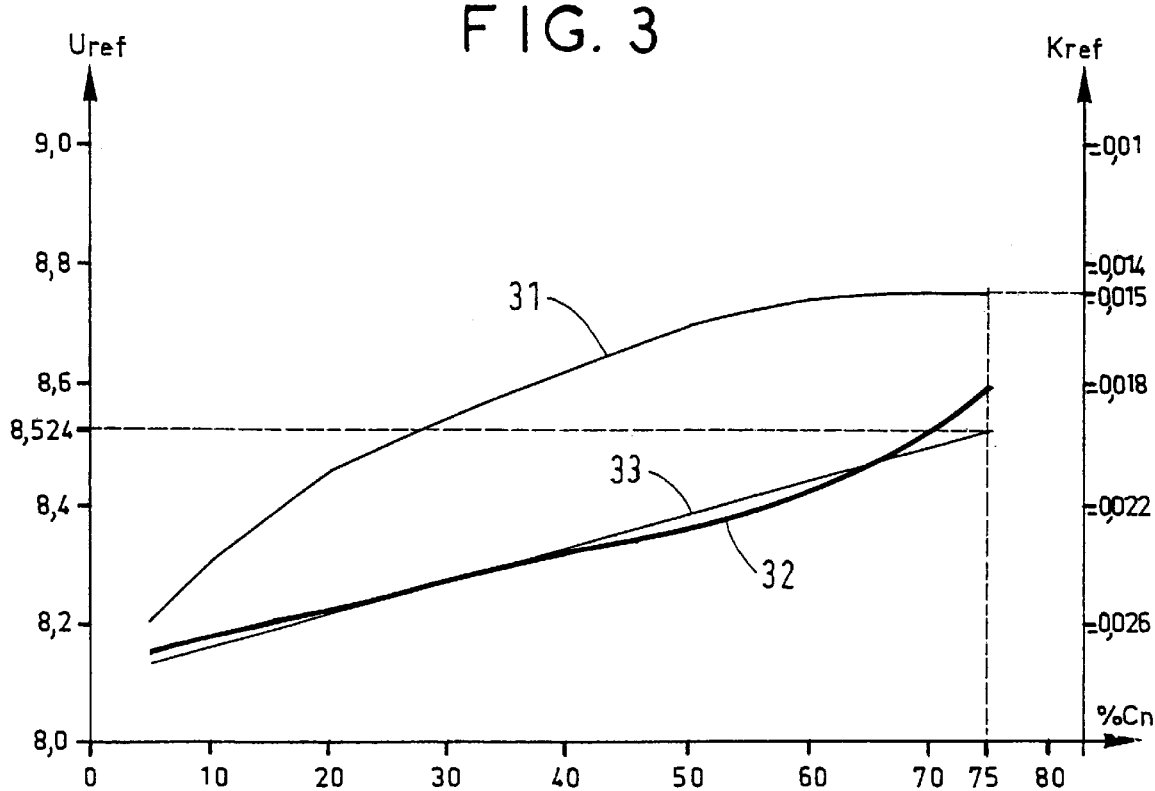
FIG. 3 is analogous to FIG. 1 for Tc=−10° C.
Figure 4:
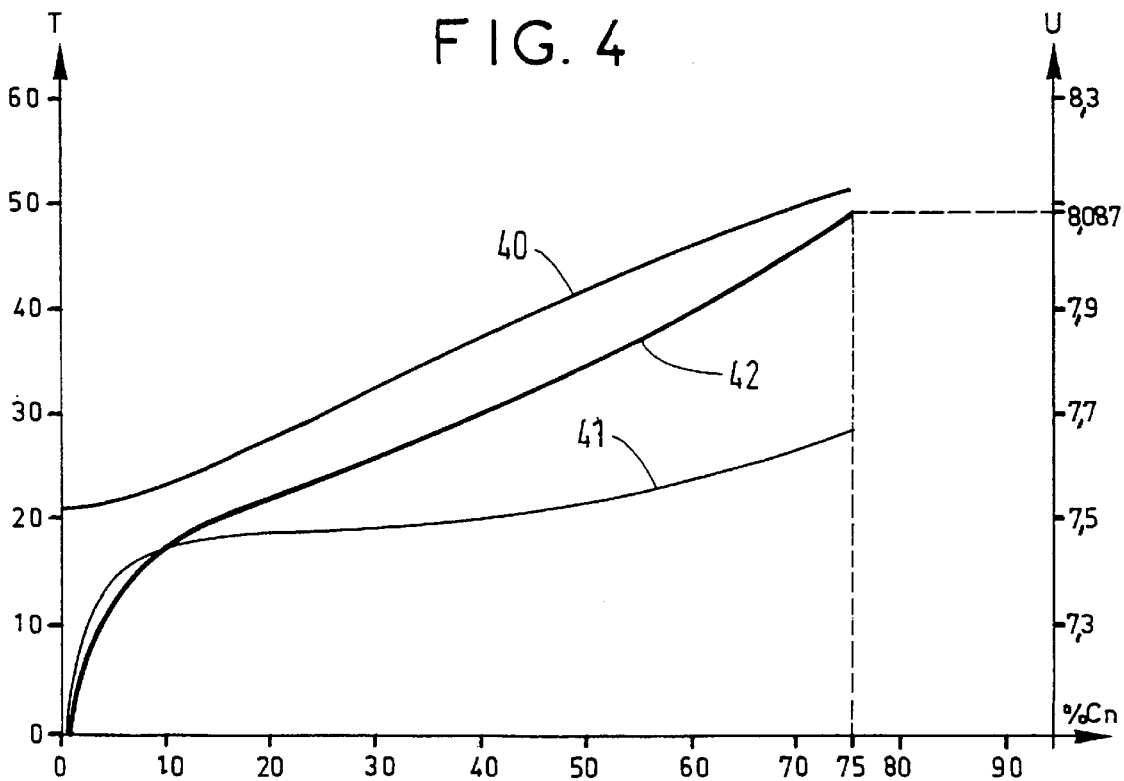
FIG. 4 shows the variation in the internal temperature and the voltage of the battery, and also the corresponding value of the correct voltage Uc for Tc 23° C., during rapid charging at a rate of 1.5 Ic, starting from 21° C.

In FIGS. 1 to 3, the corrected voltage Uc in volts and the value of the coefficient k in volts per ° C. are plotted up the ordinate, while the charged capacity of the battery is plotted along the abscissa, expressed as a percentage of its nominal capacity Cn.

In FIGS. 4 to 8, the internal temperature T in ° C., the voltage U and the corrected voltage Uc in volts are plotted up the ordinate, and the charged capacity of the battery is plotted along the abscissa, expressed as a percentage of its nominal capacity Cn.

By way of example, the method of the invention was applied to a battery of five "maintenance-free" type nickel metal hydride industrial storage cells. The battery had a nominal capacity Cn of 93 Ah and a mean discharge voltage of 6 V.

Determining k

Starting from an initial state of charge of zero, the battery was charged several times at the same rate, e.g. 1.5 Ic, with at lest two different initial temperatures, e.g. 21° C. and −10° C. During each charge, the voltage U and the internal temperature T of the battery were measured periodically.

On the basis of previously-established curves, the values for the voltage U of the battery as a function of its internal temperature T at each percentage charge were plotted. A curve U=f(T) was obtained that is substantially linear and that makes it possible to calculate a slope kref for a selected percentage charge % Cn.

The curve U=f(T) was plotted for various percentages of charge % Cn of the battery, and the values of kref obtained were marked to trace the curve 11 shown in FIG. 1.

When charged at more than 55% of Cn, it can be seen that the value of kref is substantially constant whatever the percentage charge of the battery. In this example, T is expressed in OC and kref is constant and given by k −0.015 V/OC for percentage charge in excess of 55% of Cn.

For the battery under consideration, the formula for calculating the corrected voltage Uc in accordance with the present invention is thus as follows:

Uc=U+0.015(T−Tc)

Determining Us

Using any of the previously-established curves, the value of the reference voltage Uref can be calculated for each percentage charge % Cn.

In the case shown in FIG. 1, the charging curve obtained from an initial temperature of 21° C. was used and a value of 23° C. was used as the reference temperature Tc.

Uref can thus be calculated using the following formula:

$$Uref=U-kref(T-23)$$

The value of kref used in that calculation is the value given by curve 11 in FIG. 1 for each state of charge, Curve 12 was plotted using a coefficient kref that was not constant over the range of percentage charge less than or equal to 55% of Cn, and that was constant and equal to k for percentage charge in excess of 55% Cn.

It can be seen that the reference voltage Uref varies substantially linearly with state of charge, as shown by curve 12 in FIG. 1. The slope of the curve Uref=f(% Cn) is sufficiently meaningful to enable it to be used to determine, with accuracy, the desired final percentage charge.

The curve 12 is assumed to be a straight line 13 whose equation is calculated as follows:

$$Uref=0.0105(\% Cn)+7.2923$$

Using the value of kref as given by curve 11 in this calculation serves to trace a straight line over a range that is large enough to make it possible to establish the equation accurately. The range over which the equation can be used is restricted to percentages of charge greater than 55% of Cn.

By inserting the desired final percentage charge into this equation, for example 75% charge, it is possible to calculate the stop voltage Us at which charging should be stopped, and in this case it is:

$$Us=(0.0106\times 75)+7.2923=8.087 \text{ volts}$$

By way of illustration, FIGS. 2 and 3 show how Uref is calculated using other reference temperatures Tc.

When Tc=0° C., Uref (curve 22) is given by the formula:

$$Uref=U-(kref\times T)$$

The equation of straight line 23 becomes:

$$Uref=0.0071(\% Cn)+7.8601$$

and Us for a final charge of 75% of Cn can be calculated as follows:

$$Us=(0.0071\times 75)+7.8601=8.393 \text{ volts}$$

When Tc=-10° C., Uref (curve 32) is calculated by the formula:

$$Uref=U-kref(T+10)$$

The equation for the straight line 33 becomes:

$$Uref=0.0056(\% Cn)+8.1039$$

and Us can be calculated for a final state of charge equal to 75% of Cn given by:

$$Us=(0.0056\times 75)+8.1039=8.524 \text{ volts}$$

Naturally, when calculating Uc during charging, it is necessary to use the same value for Tc as was used for determining the threshold Us at which it is decided to stop charging.

EXAMPLE 1

With the battery having an initial temperature of 21° C. (FIG. 4) charging was performed at a rate of 1.5 Ic. Its internal temperature was measured periodically (curve 40) as was its voltage (curve 41). It can be seen that for high capacity storage cells, the increase in voltage with state of charge is small.

The corrected voltage Uc (curve 42) was calculated at once using Tc=23° C. as the reference temperature, and applying the formula;

$$Uc=U+0.015(T-23)$$

In that calculation, the coefficient k was constant. The curve of the corrected voltage Uc can be used meaningfully only in the range of percentage charge in excess of 55% of Cn.

Charging was stopped when Uc became not less than Us, i.e. not less than 8.087 V. It was verified that the percentage charge achieved by the battery was indeed 75% of Cn.

EXAMPLE 2

Figure 5:
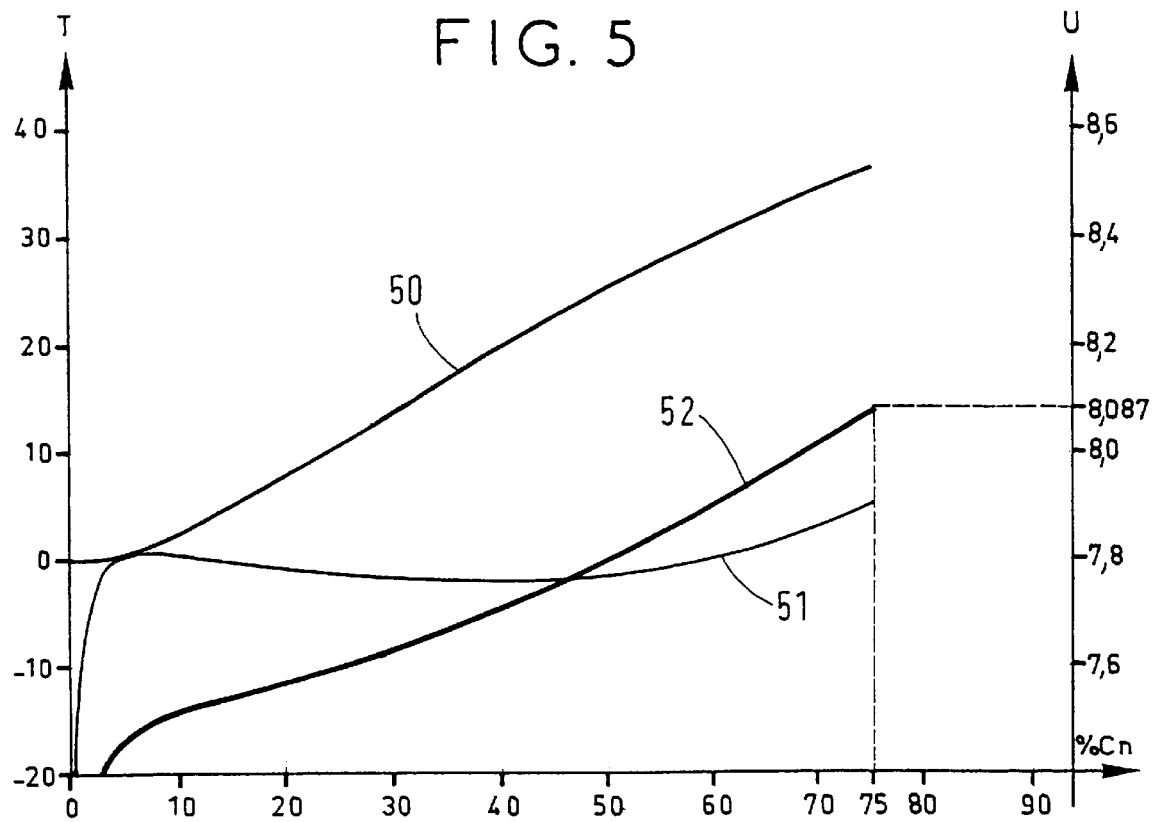
FIG. 5 is analogous to FIG. 4 for charging starting at 0° C.

Charging was performed under conditions analogous to those of Example 1, except that the initial temperature was 0° C. (FIG. 5).

The internal temperature (curve 50) and the voltage (curve 51) of the battery were measured periodically, and its corrected voltage Uc (curve 52) was calculated using the formula:

$$Uc=U+0.015(T-23).$$

Charging was stopped when Uc was not less than 8.087 V and the percentage charge reached by the battery was indeed 75% of Cn.

EXAMPLE 3

Figure 6:
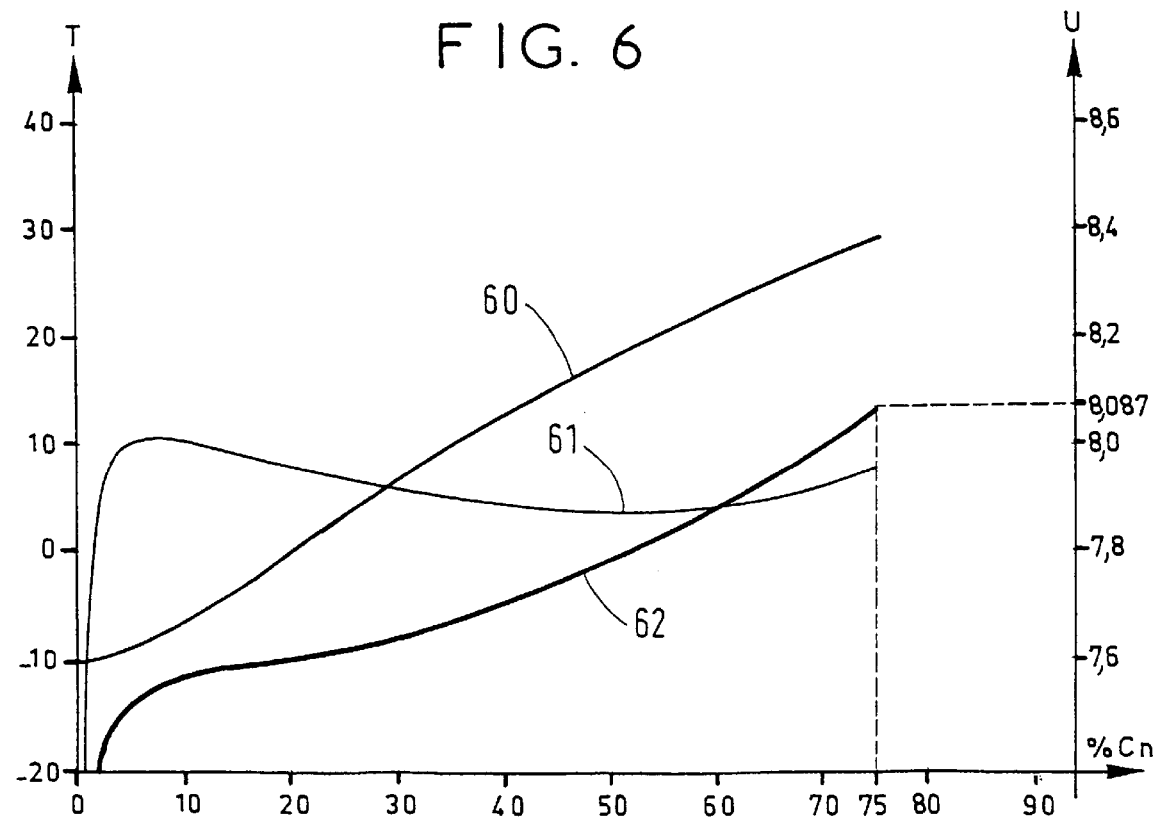
FIG. 6 is analogous to FIG. 4 for charging starting at −10° C.

Charging was performed under conditions analogous to those of Example 1, with exception that the initial temperature was -10° C. (FIG. 6).

The internal temperature (curve 60) and the voltage (curve 61) of the battery were measured periodically, and its corrected voltage Uc (curve 62) was calculated using the formula: Uc=U+0.015(T-23).

Charging was stopped when Uc was not less than 8.087 V and the percentage charge reached by the battery was indeed 75% of Cn.

EXAMPLE 4

Figure 7:
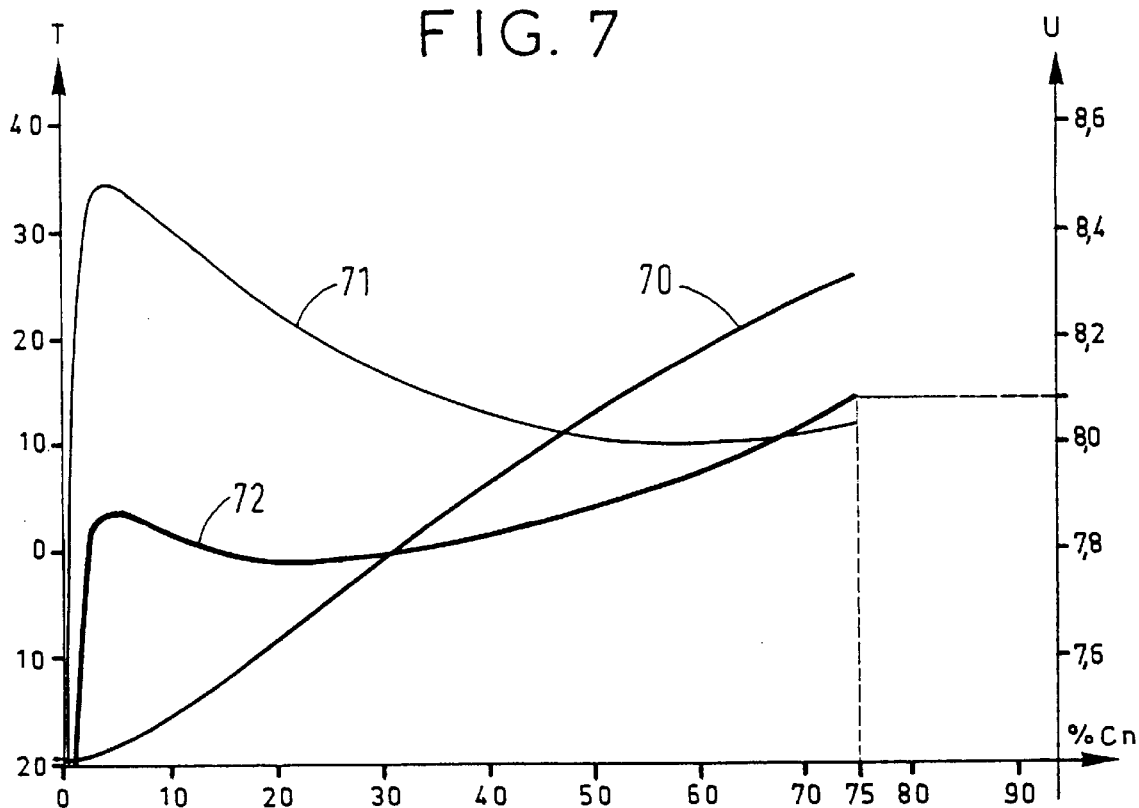
FIG. 7 is analogous to FIG. 4 for charging starting at −20° C.

Charging was performed under conditions analogous to those of Example 1, with exception that the initial temperature was -20° C. (FIG. 7).

The internal temperature (curve 70) and the voltage (curve 71) of the battery were measured periodically, and its corrected voltage Uc (curve 72) was calculated using the formula: Uc=U+0.015(T-23). It can clearly be seen that for large-capacity storage cells, the amount of heating is considerable.

Charging was stopped when Uc was not less than 8.087 V and the percentage charge reached by the battery was indeed 75% of Cn.

EXAMPLE 5

Figure 8:
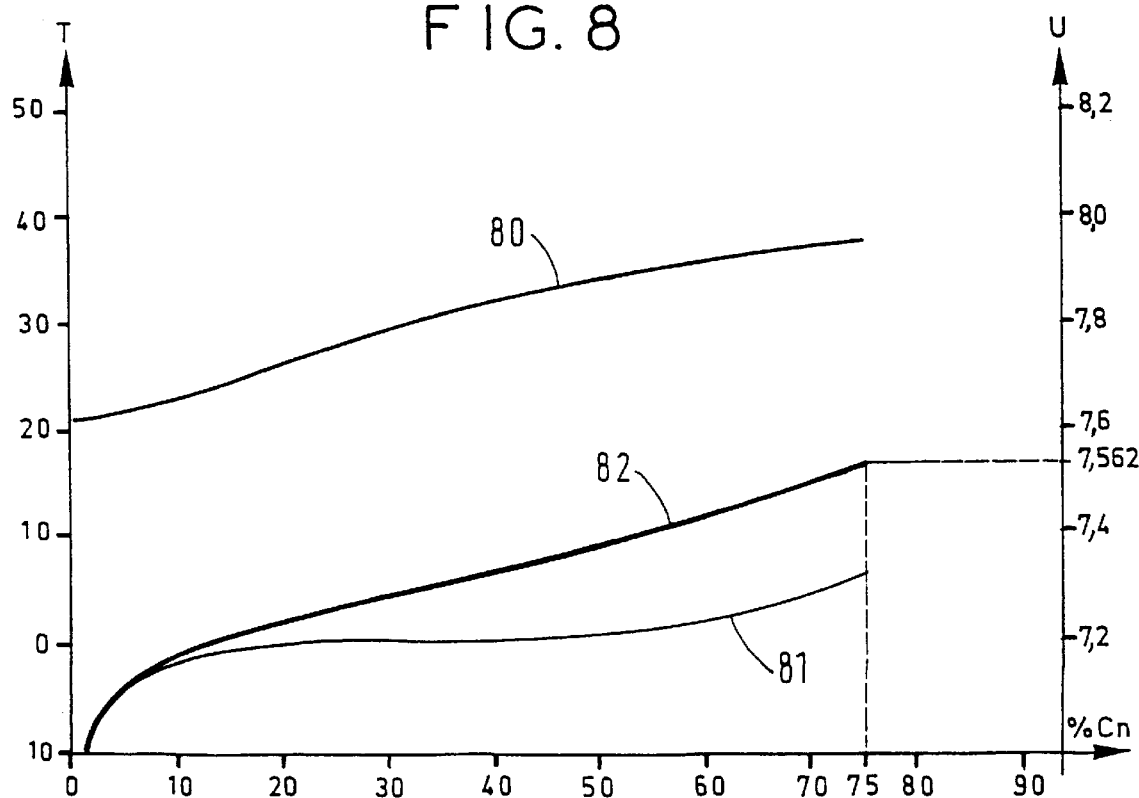
FIG. 8 is analogous to FIG. 4 for charging at a rate of 0.75 Ic.

Charging was performed under conditions analogous to those of Example 1, with exception that the rate was 0.75 Ic (FIG. 8).

As before, the internal temperature T (curve 80) and the voltage U (curve 81) of the battery were measured periodically. The corrected voltage Uc (curve 82) was calculated using the following formula:

$$Uc = U - 0.015(T-23).$$

For the same final percentage charge, the voltage threshold Us varied depending on the selected charging rate from 0.70 volts per current unit expressed in terms of Ic, while the reference temperature Tc remained unchanged. In this case, changing over from charging at a rate of 1.5 Ic to a rate of 0.75 Ic led to the threshold Us being lowered by 0.525 V, i.e. it went from 0.087 V to 7.562 V.

Charging was therefore stopped when Uc was not less than 7.562 V and the final percentage charge achieved by the battery was still 75% of Cn.

EXAMPLE 6

Charging was performed under conditions analogous to those of Example 3, with the exception of charging being performed at a rate of 0.75 Ic.

As above, the internal temperature and the voltage of the battery were measured periodically and its corrected voltage Uc was calculated using the formula:

$$Uc = U - 0.015(T-23).$$

Charging was stopped when Uc became not less than 7.562 V, and the percentage charge achieved by the battery was indeed 75% of Cn.

We claim:

1. A method of controlling rapid charging of an alkaline-electrolyte industrial storage cell of the "maintenance-free" or "sealed" type, the cell possessing a nominal capacity Cn, a voltage U, and an internal temperature T, wherein charging is stopped at a percentage charge greater than 75% of Cn as follows:

a voltage threshold Us is fixed which corresponds to the desired final percentage charge for said cell;

the voltage U and the temperature T of said cell are measured;

a corrected voltage Uc is calculated using the following formula:

$$Uc = U - k(T-Tc)$$

where voltages are expressed in volts, Tc is an arbitrarily-selected reference temperature, and k is a constant coefficient expressed in volts per temperature unit; and Uc is compared with said voltage threshold Us, and charging is stopped when Uc is not less than Us.

2. A method according to claim 1, in which said coefficient k is defined as follows:

the straight line U=f(T) is plotted for each percentage charge, from charging curves of said storage cell established at at least two different initial temperatures; and the slope of said straight line is measured in the range of percentage charge greater than 55% of Cn, said slope being equal to k.

3. A method according to claim 2, in which said coefficient k has a value of −0.015 V/° C. for percentage charges greater than 55% of Cn.

4. A method according to claim 1, in which said voltage threshold Us is fixed as follows:

a reference voltage Uref is calculated from a charging curve of said storage cell, using the formula:

$$Uref = U - kref(T-Tc)$$

in which kref is a coefficient equal to the slope of the straight line U=f(T) which is variable for percentage charge less than or equal to 55% of Cn, and then constant for percentage charge greater than 55% of Cn;

the equation of the straight line for variation of Uref as a function of percentage charge is determined; and said threshold Us is calculated from said equation for a desired final percentage charge greater than 55% of Cn.

5. A method according to claim 4, in which said threshold Us depends on charging rate by 0.70 V per current unit expressed in terms of Ic, where Ic is the current required for discharging the nominal capacity Cn of said storage cell in one hour.

6. A method according to claim 1, in which said reference temperature Tc is 0° C., said reference voltage Uref is calculated by the formula:

$$Uref = U - (kref \times T)$$

and said corrected voltage is calculated using the following formula:

$$Uc = U - kT.$$

* * * * *